United States Patent
Neidorff

(10) Patent No.: US 7,088,171 B2
(45) Date of Patent: Aug. 8, 2006

(54) CHARGE PUMP WITH CONSTANT OUTPUT CURRENT

(75) Inventor: Robert Alan Neidorff, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/461,986

(22) Filed: Jun. 13, 2003

(65) Prior Publication Data

US 2004/0251955 A1   Dec. 16, 2004

(51) Int. Cl.
    *G05F 3/02*   (2006.01)
(52) U.S. Cl. .................................. 327/536; 363/59
(58) Field of Classification Search ............... 327/534, 327/536; 363/59
    See application file for complete search history.

(56) References Cited

U.S. PATENT DOCUMENTS

| | | | | |
|---|---|---|---|---|
| 5,081,371 A | * | 1/1992 | Wong | 327/536 |
| 5,359,299 A | | 10/1994 | Webster | 331/8 |
| 5,399,928 A | * | 3/1995 | Lin et al. | 327/434 |
| 5,436,587 A | | 7/1995 | Cernea | 327/536 |
| 6,008,690 A | * | 12/1999 | Takeshima et al. | 327/534 |
| 6,198,340 B1 | * | 3/2001 | Ting et al. | 327/536 |
| 6,456,151 B1 | * | 9/2002 | Pontarollo | 327/536 |
| 6,535,051 B1 | | 3/2003 | Kim | 327/536 |
| 6,538,930 B1 | * | 3/2003 | Ishii et al. | 365/189.09 |
| 2003/0201820 A1 | * | 10/2003 | Katsuhisa | 327/536 |

* cited by examiner

*Primary Examiner*—Terry D. Cunningham
(74) *Attorney, Agent, or Firm*—W. James Brady, III; Frederick J. Telecky, Jr.

(57) ABSTRACT

An improved charge pump circuit that is capable of producing a constant output current. The charge pump circuit includes a controllable current source, at least one switching element coupled between the controllable current source and an output node, and a load capacitor coupled between the output node and ground potential. The switching element switches in response to an input signal to allow current pulses to flow from the controllable current source through the output node. The load capacitor operates as an integrator to convert the output current pulses into a voltage level. The controllable current source provides increased current levels as the output voltage level of the charge pump increases, thereby enhancing the overall efficiency of the charge pump circuit.

13 Claims, 2 Drawing Sheets

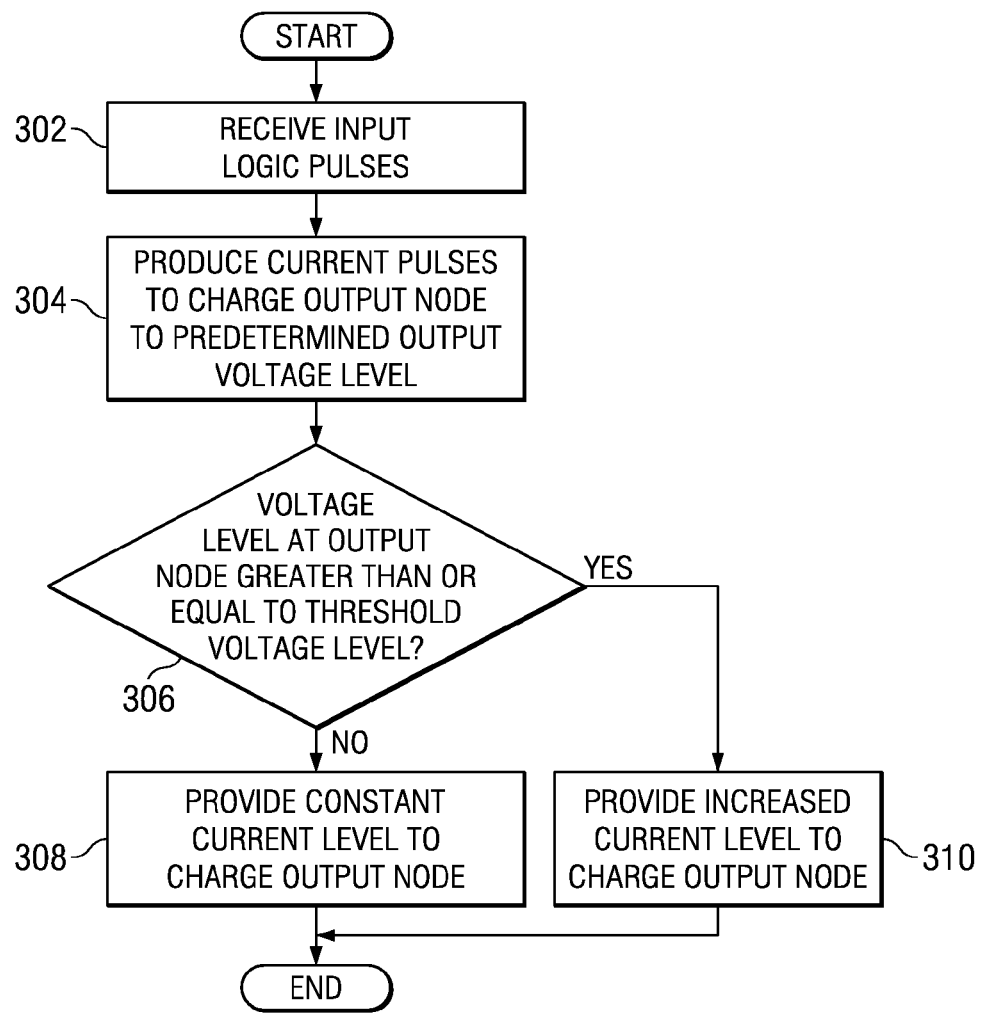

CHARGE PUMP WITH CONSTANT OUTPUT CURRENT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present application relates generally to integrated circuits, and more specifically to a charge pump circuit providing a constant output current.

Charge pump circuits are known that may be employed in integrated circuits to charge one or more circuit nodes to predetermined voltage levels. For example, a conventional charge pump circuit may include at least one current source, at least one switching element coupled between the current source and an output node, and a load capacitor coupled between the output node and ground potential. In a typical mode of operation, the switching element switches in response to an input signal to allow current pulses to flow from the current source through the output node. Further, the load capacitor operates as an integrator to convert the current pulses into an output voltage level.

One drawback of the conventional charge pump circuit is that as the output level increases the efficiency of the charge pump frequently decreases, which can manifest itself in a reduction in the charge rate of the charge pump over time. This is, at least in part, because the conventional charge pump is often incapable of delivering a constant output current. Such inefficiency can also make the conventional charge pump susceptible to, e.g., unwanted output leakage currents and limited output slew rates.

It would therefore be desirable to have an improved charge pump circuit that provides a constant output current and avoids the drawbacks of the above-described conventional charge pump circuit.

BRIEF SUMMARY OF THE INVENTION

In accordance with the present invention, an improved charge pump circuit is provided that is capable of producing a constant output current. The presently disclosed charge pump circuit achieves such benefits by employing a controllable current source that produces a controlled current that increases as the output level of the charge pump increases.

In one embodiment, the charge pump circuit includes a controllable current source, at least one switching element coupled between the controllable current source and an output node, and a load capacitor coupled between the output node and ground potential. The switching element is configured to switch in response to an input signal to allow current pulses to flow from the controllable current source through the output node. Further, the load capacitor is operative as an integrator to convert the output current pulses into a voltage level. The controllable current source is configured to provide increased current levels as the output voltage level of the charge pump increases, thereby enhancing the overall efficiency of the charge pump circuit.

By increasing the current charging the output node as the output voltage level increases, the charge pump circuit provides enhanced efficiency over an extended range of operating conditions.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 3 is a flow diagram of a method of operating the charge pump circuit of FIG. 2a.

DETAILED DESCRIPTION OF THE INVENTION

An improved charge pump circuit is disclosed that is capable of providing a constant output current. The presently disclosed charge pump circuit increases the current flowing to the charge pump output as needed to maintain the desired constant output current level, thereby providing enhanced efficiency over an extended range of operating conditions.

Figure 1A:
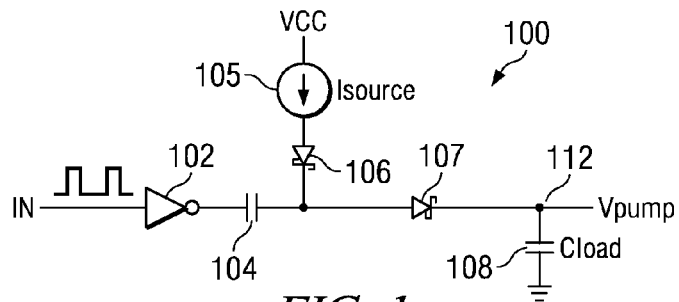
FIG. 1a is a schematic diagram of a conventional charge pump circuit.

FIG. 1a depicts a conventional single stage charge pump circuit 100, which includes an input buffer configured as an inverter 102, a Direct Current (DC) blocking capacitor 104, a constant current source 105 providing a constant current $I_{source}$, a plurality of diodes 106–107, and a load capacitor ($C_{load}$) 108. In the illustrated embodiment, the inverter 102 receives an input (IN) signal comprising a series of binary logic pulses. In response to the applied logic level pulses, current pulses flow from the current source 105 through the diodes 106–107 to charge an output node 112 to a predetermined voltage level $V_{pump}$. Because the current source 105 is a constant current source, the current level provided by the current source 105 does not exceed the level of $I_{source}$. As a result, the output slew rate "dV/dt" of the charge pump 100 is limited to $$dV/dt = I_{source}/C_{load}. \qquad (1)$$

In effect, the $I_{source}$ current level determines the output slew rate dV/dt of the charge pump 100 according to equation (1) above.

Figure 1B:
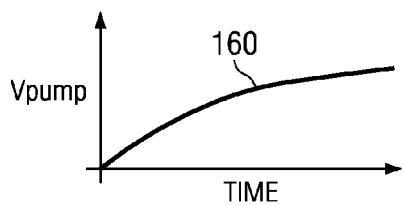
FIG. 1b is a diagram of the output voltage level of the conventional charge pump circuit of FIG. 1a versus time.

FIG. 1b depicts a representation 160 of the output voltage level $V_{pump}$ of the conventional charge pump circuit 100 (see FIG. 1a) as a function of time. As indicated in FIG. 1b, the output slew rate dV/dt of the charge pump 100 is limited, specifically, by the level of $I_{source}$, as described above. FIG. 1b further indicates that the efficiency of the charge pump 100 decreases as the output voltage level $V_{pump}$ increases, thereby resulting in an effective reduction in the charge rate of the charge pump 100 over time.

Figure 2A:
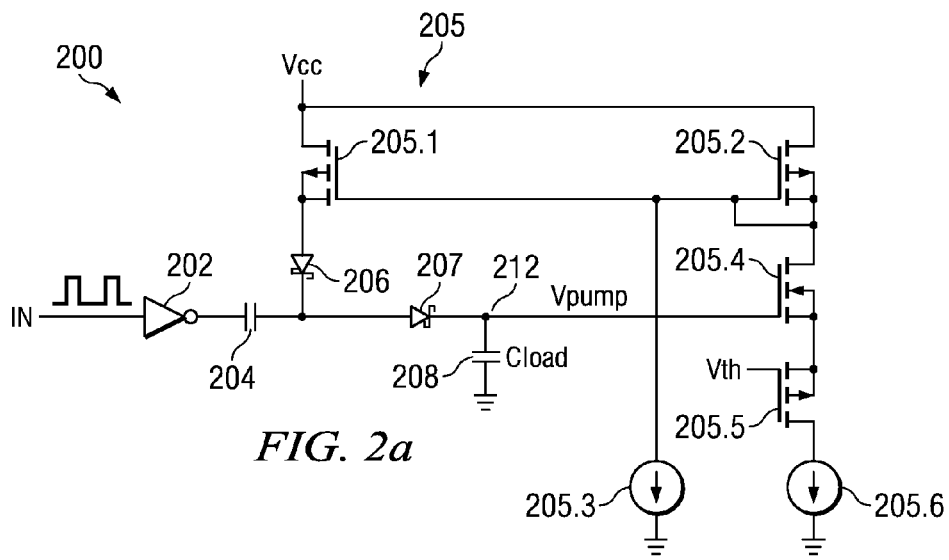
FIG. 2a is a schematic diagram of an improved charge pump circuit according to the present invention.

FIG. 2a depicts an illustrative embodiment of a charge pump circuit 200, in accordance with the present invention. In the illustrated embodiment, the charge pump 200 comprises a single stage charge pump including an input buffer configured as an inverter 202, a DC blocking capacitor 204, a controllable current source 205, a plurality of switching elements such as diodes 206–207, and a load capacitor ($C_{load}$) 208. Specifically, the controllable current source 205 comprises a current mirror including PMOS transistors 205.1–205.2, each of which is connected to the power supply voltage Vcc. The controllable current source 205 further comprises a first reference current source 205.3 connected between the gates of the PMOS transistors 205.1–205.2 and ground potential, a second reference current source 205.6 connected to ground potential, and a folded differential amplifier pair including an NMOS transistor 205.4 and a PMOS transistor 205.5 connected between the PMOS transistor 205.2 and the second reference current source 205.6. The gate of the NMOS transistor 205.4 is connected to a circuit node 212, which is the output of the charge pump 200. Moreover, a predetermined voltage level Vth is applied to the gate of the PMOS transistor 205.5.

It should be understood that a controllable current source such as the controllable current source 205 may be employed with any suitable single or multi-stage charge pump circuit implemented using any suitable integrated circuit technology to provide a charge pump with a constant output current according to the present invention. The controllable current source 205 is employed with the single stage charge pump of FIG. 2a for purposes of illustration. It is also understood that the predetermined voltage level Vth at the gate of the PMOS transistor 205.5 may comprise any suitable voltage level.

In an illustrative mode of operation, the inverter 202 receives an input (IN) signal comprising a series of binary logic pulses, i.e., "pump up" and "pump down" pulses. In response to the applied logic level pulses, current pulses flow from the controllable current source 205 through the diodes 206–207 to charge the output node 212 to a predetermined voltage level $V_{pump}$. While the voltage level at the output node 212 is less than the threshold voltage of the folded differential amplifier pair 205.4–205.5 with the voltage level Vth applied to the gate of the PMOS transistor 205.5, essentially no current flows through the transistors 205.4–205.5. As a result, the controllable current source 205 operates as a current mirror providing a substantially constant current, as determined by the first reference current source 205.3, to charge the output node 212 of the charge pump 200.

When the voltage at the output node 212 charges to a level that is equal to or greater than the threshold voltage of the circuit comprising the folded differential amplifier pair 205.4–205.5, the transistors 205.4–205.5 conduct current, thereby causing the current mirror of the controllable current source 205 to increase the flow of current through the output node 212. It is noted that the increased current level provided by the controllable current source 205 is primarily determined by the second reference current source 205.6. Because the current charging the output node 212 increases as the voltage level at the node 212 increases, limitations in the output slew rate dV/dt of the charge pump 200 are significantly reduced.

In the preferred embodiment, the NMOS and PMOS transistors 205.4–205.5 of the folded differential pair each have a relatively low $g_m$ parameter to assure that the current provided by the controllable current source 205 increases in a gradual manner. It is noted that the folded differential pair configuration of the NMOS and PMOS transistors 205.4–205.5 allows the amplifier threshold voltage Vth at the gate of the transistor 205.5 to be equal to or less than the supply voltage Vcc. As a result, the charge pump 200 generally does not require power supply voltages greater than Vcc. Moreover, increased loading of the charge pump 200 is avoided.

Figure 2B:
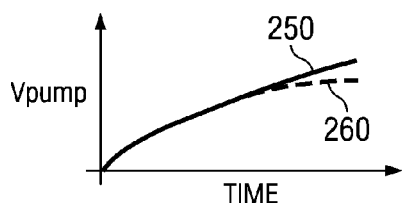
FIG. 2b is a diagram of the output voltage level of the charge pump circuit of FIG. 2a versus time.

FIG. 2b depicts the respective output voltage levels $V_{pump}$ of the charge pump circuit 200 (as represented by a solid curve 250) and the conventional charge pump circuit 100 (as represented by a dotted curve 260) as functions of time. A comparison of the two curves 250 and 260 shows that the output slew rate dV/dt of the charge pump 200 exceeds that of the conventional charge pump. This is because the controllable current source 205 of the charge pump 200 (see FIG. 2a) increases the current flowing to the output node 212 as the voltage level at that node increases, thereby compensating for the inherent inefficiency of the conventional charge pump. This also allows the charge pump 200 to effectively deliver a constant output current.

A method of operating the presently disclosed charge pump circuit is illustrated by reference to FIG. 3. As depicted in step 302, the input buffer of the charge pump receives an input signal comprising a series of binary logic pulses, i.e., pump up and pump down pulses. In response to the applied logic level pulses, the controllable current source produces, as depicted in step 304, a plurality of current pulses to charge the output node of the charge pump to a predetermined output voltage level. Next, a determination is made, as depicted in step 306, as to whether the voltage level at the output node of the charge pump is greater than or equal to a threshold voltage level. In the event the voltage level at the output node is not greater than or equal to the threshold voltage level, the controllable current source provides, as depicted in step 308, a substantially constant current to charge the output node of the charge pump. In the event the voltage level at the output node is greater than or equal to the threshold voltage level, the controllable current source provides, as depicted in step 310, an increased current level to charge the output node of the charge pump. By employing this feed-forward approach to increase the current flowing through the output node as the output voltage level rises, the output current of the charge pump circuit remains substantially constant. Moreover, the charge pump has a relatively simple circuit configuration that is less sensitive to leakage current.

It is appreciated that alternative embodiments of the presently disclosed charge pump circuit may be employed to increase the current flowing to the output node as the voltage level at that node increases. For example, the charge pump may alternatively include respective pluralities of current sources and comparators suitably configured to increase the current at the output node in a piecewise manner, with as many breakpoints as desired. Moreover, the PMOS transistor 205.1 of the controllable current source 205 may alternatively be connected to the power supply connection of the inverter 202 and the diode 206 may be connected to the supply voltage Vcc.

It will further be appreciated by those of ordinary skill in the art that modifications to and variations of the above-described charge pump with constant output current may be made without departing from the inventive concepts disclosed herein. Accordingly, the invention should not be viewed as limited except as by the scope and spirit of the appended claims.

What is claimed is:

1. A charge pump circuit, comprising:
an input to input an input signal;
an output node;
a capacitive load coupled to the output node;

a controllable current source configured to provide current to charge the output node to a predetermined output voltage level; and at least one switching element having its path coupled between the controllable current source and the output node, wherein the switching element is configured to switch in response to an input signal at the input, thereby allowing current to flow from the controllable current source to the output node, and wherein the controllable current source is configured, in the event the output voltage level is less than a first voltage level, to provide at least one first current level to the output node and, in the event the output voltage level is greater than the first voltage level, to provide at least one second current level to the output node, the second current level being greater than the first current level.

2. The charge pump circuit of claim 1 further including an input buffer coupled between the input and the switching element.

3. The charge pump circuit of claim 1 wherein the capacitive load is configured as an integrator to convert the current provided to the output node by the controllable current source into an output voltage.

4. The charge pump circuit of claim 1 wherein the controllable current source is further configured to provide the first and second current levels to the output node to produce a substantially constant output current through the load.

5. The charge pump circuit of claim 1 wherein the controllable current source includes a current mirror and a first reference current source, and wherein the first current level is substantially determined by the first reference current source.

6. The charge pump circuit of claim 5 wherein the controllable current source further includes a second reference current source, and wherein the second current level is substantially determined by the second reference current source.

7. The charge pump circuit of claim 1 wherein the controllable current source is configured for gradually increasing the current level provided to the output node from the first current level to the second current level.

8. A method of operating a charge pump circuit, comprising the steps of:

in response to an input signal, producing a plurality of current pulses to charge an output node to a predetermined output voltage level by a controllable current source, the output node having a capacitive load coupled thereto;

in the event the output voltage level is less than a first voltage level, providing at least one first current level to the output node by the controllable current source; and in the event the output voltage level is greater than the first voltage level, providing at least one second current level to the output node by the controllable current source, the second current level being greater than the first current level, thereby producing a substantially constant output current through the load, wherein the producing step includes producing the plurality of current pulses by at least one switching element having its path coupled between the controllable current source and the output node.

9. The method of claim 8 further including the step of buffering the input signal by an input buffer.

10. The method of claim 8 further including the step of converting the current pulses charging the output node to a corresponding output voltage across the load.

11. The method of claim 8 further including the step of determining the first current level by a first reference current source included in the controllable current source.

12. The method of claim 8 further including the step of determining the second current level by a second reference current source included in the controllable current source.

13. The method of claim 8 further including the step of gradually increasing the current level provided to the output node from the first current level to the second current level by the controllable current source.

* * * * *